United States Patent [19]

Pavlik et al.

[11] 3,948,690

[45] Apr. 6, 1976

[54] MOLDED MAGNETIC CORES UTILIZING CUT STEEL PARTICLES

[75] Inventors: Norman M. Pavlik, Pittsburgh; James W. Cunningham, Vandergrift, both of Pa.

[73] Assignee: Westinghouse Electric Corporation, Pittsburgh, Pa.

[22] Filed: Oct. 24, 1974

[21] Appl. No.: 517,700

Related U.S. Application Data

[63] Continuation-in-part of Ser. No. 396,260, Sept. 11, 1973, abandoned.

[52] U.S. Cl. .............. 148/31.55; 29/596; 148/105; 148/122; 264/111; 335/297; 264/DIG. 58; 336/233
[51] Int. Cl.² ......................................... C04B 35/00
[58] Field of Search ........ 148/108, 31.55, 335, 264, 148/103, 104, 105, 121, 122; 264/111, DIG. 58; 29/596, 608; 336/233

[56] References Cited
UNITED STATES PATENTS

| 1,932,639 | 10/1933 | Roseby | 148/31.55 |
|---|---|---|---|
| 2,384,215 | 9/1945 | Toulmin | 148/105 |
| 2,864,734 | 12/1958 | Adams et al. | 148/104 |
| 3,602,986 | 9/1971 | Conwicke | 29/608 |
| 3,848,331 | 11/1974 | Pavlik et al. | 29/596 |

*Primary Examiner*—Walter R. Satterfield
*Attorney, Agent, or Firm*—R. T. Randig

[57] ABSTRACT

There is disclosed a magnetic core and the method of making the same. The core is formed of a plurality of microlaminations. Since each discrete microlamination is of elongated rectangular shape, soft, ductile and magnetically insulated, the cores exhibit improved permeability, lower core loss, lower exciting volt amps and exhibit improved high frequency characteristics.

32 Claims, 9 Drawing Figures

MOLDED MAGNETIC CORES UTILIZING CUT STEEL PARTICLES

CROSS-REFERENCE TO RELATED APPLICATIONS

The present application is a continuation-in-part of application Ser. No. 396,260, now abandoned and is closely related to the subject matter contained in application Ser. No. 396,256 now U.S. Pat. No. 3,848,331 and application Ser. No. 396,257 now abandoned each of said applications having been filed on Sept. 11, 1973.

BACKGROUND OF THE INVENTION

1. Field of the Invention

The present invention relates to a magnetic core which is formed of substantially flat, elongated, rectangular particles which are termed "microlaminations". These microlaminations are formed from plain carbon steel by cutting the same into a discretely-shaped particle (an elongated parallelopiped of generally rectangular cross-section) following which the microlaminations are decarburized, magnetically insulated and thereafter placed in a mold and pressed to the desired density, said pressing being effective without the use of a binder for producing the finished unitary magnetic core.

2. Description of the Prior Art

Magnetic cores for medium and high frequency uses are often produced from powdered metal magnetic materials or flakes, the latter being usually made by rolling powder particles to a plate-like structure. The purpose of using powders or flakes is to provide increased temperature stability and decreased electrical losses when subjected to high frequency eddy currents because air gaps and insulation are present between the individual particles of the powders or the flakes. Air gaps are desirable to decrease losses but undesirable in another respect since they lower the effective permeability because there is a lower volume of magnetic material in each unit core volume.

Some of the disadvantages of the lower permeability present in powdered iron cores is overcome by fabricating the cores from flakes which yield a higher density or packing factor. Siginificantly, the flakes also improved the Q factor at lower frequency. The Q factor is defined as the ratio of the reactance of the core to the effective series resistance of the core. Generally speaking, the flakes are insulated and flat, the length and width dimensions being much larger than their thickness.

In U.S. Pat. No. 2,689,398 to G. C. Gaut et al, there is disclosed a method of making magnetizable compacts. As there set forth, the magnetic material in fine particulate or powder form is fed to a pair of flaking rollers where the material is flattened to a flake thickness usually in the range between about 0.015 and about 0.025 millimeter in thickness and transverse dimensions of from about 0.02 to about 0.5 millimeter. Following flattening, the flaked material is mixed with silica powder to separate the flakes, and the mixture is heated to a temperature of about 900°C in order to remove the strains induced during the cold working of the particulate material through the flaking rolls. Advantageously, hydrogen or cracked ammonia is utilized to prevent oxidation of the materials during said annealing processing. After annealing, the flakes, in the soft condition, are transferred to a separator for removing the silica and thereafter, preferably the flakes are then treated to provide an oxidized surface thereon by heating in air to a temperature within the range between about 200° and 250°C. The patentees found, however, that the presence of an oxide surface on the flakes is not essential. Thereafter, the flakes were charged into a die of predetermined configuration and the flakes were preferably so disposed in the die to assume positions in which they lie parallel to the magnetic lines of force to be set up in the core during subsequent use. Punches were applied to the die so as to exert a pressure of between 15 to 30 tons per square inch to the faces of the flakes, thereby compressing them into the final core configuration.

Other workers in the field as typified by U.S. Pat. No. 3,255,052 to Opitz, follow essentially the same route, namely starting with a metallic powder and thereafter rolling the same to form a flake which is ultimately utilized within a core configuration. Notably different with Opitz is the fact that he requires each of the individual flakes to be magnetically insulated by a plurality of coatings which coatings permit the finally configured core to be annealed at a high temperature without destroying the magnetic flake insulation. Thus, after the core was finally formed, the same was annealed at a temperature between 800° to about 950°C to relieve the work strains and produce the desired magnetic characteristic. Following heat treatment the cores were quenched at a rate of between about 15° and about 75°C per minute. While Opitz is directed to a method particularly adapted to that material known commercially as molybdenum permalloy, it is stated that the process is also effective when used with other materials.

Other patentees, namely Adams et al. in U.S. Pat. No. 2,937,964, also use molybdenum permalloy and teach a method for melting the composition as well as formulating the powder, flaking, annealing, insulating, aligning and compacting the same. This is followed by another final annealing of the finished core at a temperature within the range between about 600° and about 700°C and the annealed core is thereafter quenched in air to room temperature.

Thus, from the foregoing practices, it becomes clear that the preferred method of the prior art was to employ metallic particles either spheroidal or irregular in shape and flattening the same to form the individual flake-like laminates going into the core. Opitz teaches that the permeability of the magnetic core will vary with the flake diameter and the core losses varies with the flake thickness, both increasing with increases in their respective dimensions.

Roseby, U.S. Pat. No. 1,850,181 suggests that cores may be prepared by drawing fine wire preferably of a nickel-iron alloy, of a diameter of 4 mills, cutting the wire into small lengths, which wire is annealed, coated with an iron-phosphate, then coated with an insulating varnish and finally pressed to 10 to 15 tons per square inch into a core. In order to fill the relatively large spaces between the wire lengths, Roseby states that up to 20% of powdered iron be added to produce a more compact core. Fine wire is extremely expensive to produce, and as Roseby indicated, the sections of wire have such a poor packing or space factor that even if the round wire sections are perfectly arranged, at least up to 20% of powdered iron should be added to fill some of such spaces in producing a more efficient core.

In contrast thereto, the applicants' present invention employs a heretofore commercially available, flat worked sheet material in a new and different manner and by forming discretely-shaped microlaminates, the several improvements and benefits of particulate cores can be obtained using microlaminations in the manner which will appear more fully hereinafter.

SUMMARY OF THE INVENTION

The material which is employed in making the microlaminations which are utilized in forming a core preferably comprise a plain carbon thin steel sheet preferably of that character known in the trade as AISI Type 1010 steel. The plain carbon thin steel sheet is cut into small, substantially elongated, rectangular-shaped parallelopiped particles having preferred dimensions of length, width and thickness. Following the mechanical formation of the microlaminations, they are subject to an annealing heat treatment in which the plain carbon steel is decarburized and deoxidized to develop the required magnetic properties and at the same time the stresses are relieved which have been incurred during cold rolling of the plain carbon steel to finish gauge as well as in the formation of the microlaminations. Thereafter, the microlaminations are subjected to a coating which, in practice comprises a magnesium oxide based formulation which forms a very thin but flexible coating which adheres even after the materials have been subjected to the molding pressure to form the core. The coated microlaminations are thereafter placed in a mold or die and magnetically aligned preferably utilizing an iron pole piece of an electromagnet. Thereafter, the punches are inserted within the die and the material subjected to the influence of pressure preferably within the range between about 50 and about 100 tons per square inch to accomplish a packing factor in excess of about 80%. Following pressing, the consolidated core may be removed from the die and it will maintain its shape and dimensions.

DESCRIPTION OF THE PREFERRED EMBODIMENTS

The material from which the microlaminations are made is preferably a plain carbon steel normally of that type used for tin cans. This is a low carbon steel and is recommended because of its low cost and availability. The material is usually purchased in the form of "black plate", that is, the condition of the tin can steel prior to tinning. It is readily available in a wide range of thicknesses usually ranging from about 0.005 to about 0.020 inch in thickness. This black plate tin can stock material is one of the lowest cost ferrous products in this thickness range. Typically the AISI Type 1010 steell will steel a composition containing between about 0.07% and about 0.13% carbon, about 0.30% and about 0.60% manganese, about 0.040% maximum phosphorus, about 0.050% maximum sulfur and the balance essentially iron with incidental impurities. It should be pointed out, however, that while the preferred material is a plain carbon steel, such other magnetic materials as silicon containing steels as well as nickel-iron, molybdenum permalloy, and other alloys may be employed in practicing the present invention.

It is preferred to have the steel with some degree of strength to it so that when the microlaminations are formed they do not become grossly distorted as will appear more fully hereinafter. Consequently, a plain carbon steel from about 0.05 to 0.15% carbon is ideally suited, for this material will have sufficient strength and yet is sufficiently ductile that the steel can be readily sheared into microlamination sizes as will be described. While exceedingly low carbon steels (more properly called "iron") can be employed, they are not recommended because of the tendency to distort during the microlamination formation operation. The plain carbon steel or other magnetic alloy is usually purchased in the cold rolled condition, the plain carbon steel preferably has a grain size of the order of ASTM No. 9. By employing the various magnetic materials in their cold worked condition, from which the microlamination can be severed, the resulting product, namely the microlamination, is in the form of a thin, elongated parallelopiped of substantially rectangular cross-section. The cold worked condition of the flat worked sheet material thus facilitates the formation and the retention of the as-severed shape. Moreover, the cold worked condition with its consequent higher strength and lowered ductility fosters a cleaner edge, (less burning) during the severing operation so that when the microlaminations are molded into the finished configuration, the tendency to pierce the insulation is considerably reduced.

Figure 1:
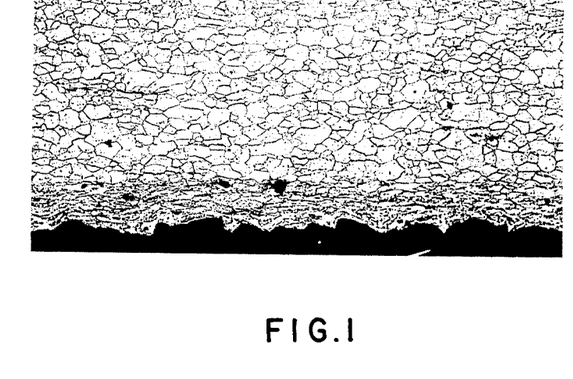
FIG. 1 is a photomicrograph of a microlamination taken at a magnificaion of 200X prior to annealing.

Referring now to FIG. 1 of the drawings, there is shown a photomicrograph of the material as cut in its microlamination form. The grains are quite fine and are substantially elongated indicating that the material is in its cold rolled condition. The cold work condition plus the carbon content of the plain carbon steel makes this material ideally suited to the formation of the substantially elongated rectangular microlaminations which are employed in making the cores.

At the outset, it should be noted that while a wide range of steel particles sizes and thicknesses are satisfactory, it is nonetheless preferred to control the microlaminations to the form of a thin elongated parallelopiped of rectangular cross-section having dimensions between about 0.05 and about 0.20 inch in length, about 0.005 and about 0.05 inch in width and from about 0.002 to about 0.02 inch in thickness. Within this broad range, particularly satisfactory results have been obtained where the individual microlamination particle length ranges from about 0.050 to about 0.150 inch, from about 0.010 to about 0.030 inch in width and between about 0.006 and about 0.013 inch in thickness.

The microlaminations may be formed in any number of ways and the particular manner of fashioning the microlamination is dictated solely by the overall economics of the process. Currently, the steel is cut with a high speed rotary die cutter in free space or it may be slit to narrow ribbons of the width desired and then the microlaminations are severed with a rotary cutter as the narrow ribbons pass over a stationary knife edge anvil. It is obvious in this latter aspect to align the cutter and the slitter for continuous operation. In practice, good results are obtained where a single strand of Type 1010 carbon steel, for example, about 4 inches wide is slit into a plurality of narrow ribbons, each ribbon measuring approximately 0.055 inch in width. The width of the slit ribbon thereafter forms the length dimension of the microlaminate and by advancing the ribbon at a predetermined speed into a rotating cutter comprising a plurality of knives which is also moving at a predetermined speed, the width dimension of the microlaminates will be determined by the speed at which the slit ribbon advances across the face of the stationary knife before the material is sheared by a rotating knife. Thus, the faster the speed of advance of the slit ribbon and the slower the cutter rotation, the greater will be the width of the microlamination thus formed and vice versa.

In this respect, it has been found that with the sheet material in the cold worked condition with about 0.10% carbon, some burring of the microlaminaton occurs upon shearing whether the same is done in free space or against a stationary knife edge anvil. It has been found that such burring as does occur, does not grossly affect the ultimate magnetic characteristics exhibited by the finished core. One experiment was performed wherein microlaminations which were formed in the foregoing described manner were treated in accordance with the process of the present invention and a similar batch of microlaminations was thereafter chemically polished to remove any burrs that occurred during the manufacturing operation. Aside from this deburring operation, the two batches were processed identically from the same stock of carbon steel material into finished cores. No substantial differences were noted in the observed magnetic characteristics between the cores formed from the deburred and the undeburred microlaminations especially when both cores are formed by the presently disclosed process.

Following the formation of the microlaminations having the sizes within the foregoing described ranges, it now becomes necessary to improve the magnetic characteristics and adjust the mechanical characteristics so that a strong, dense core with good magnetic properties may be formed therefrom. In order to do this, the microlaminations produced from carbon steel must be decarburized and deoxidized in order to develop the required magnetic properties. Since the carbon has served the purpose of strengthening the steel for the formation of the microlaminations, it is desired to remove as much carbon as possible not only to improve the magnetic characteristics but also to soften the steel to a sufficient degree that upon the later application of pressure in order to form the core, the steel will be in its softest condition from a mechanical standpoint and therefore can be more densely packed in order to secure the requisite magnetic characteristics in the finished core. This is most conveniently accomplished by means of a decarburizing annealing heat treatment.

It will be appreciated that some magnetic materials will be commercially produced in which the composition is already low in carbon. Typical of such materials are silicon steel, nickel-irons and the permalloys. As a result, it is not necessary to subject microlaminations of these materials to a decarburizing heat treatment. Nonetheless microlaminations formed from these materials will require heat treatment in order to remove the effects of cold work, improve the magnetic characteristics compared to the magnetic characteristics exhibited by the microlamination in the "as-severed" condition and to deoxidize the same.

In the case of the microlaminations formed from tin plate stock, the preferred heat treatment consists of heating the microlaminations to a temperature within the range between about 700° C and about 800° C for a period of about 4 hours. While shorter time periods can be utilized, as well as longer time periods, it has been found sufficient to heat the microlaminations at a temperature within the stated range for a time period of about 2 hours while employing a wet hydrogen atmosphere having a dewpoint preferably in excess of about +120° F. The wet hydrogen atmosphere and the temperature to which the microlaminates are heated cooperate to effectively decarburize the steel, a nominal 0.10% carbon containing steel being decarburized to a value of about 0.002% carbon within a period of about 2 hours. As little as 0.5 hour at 800° C is satisfactory. It will of course be appreciated that longer annealing times may remove additional carbon while shorter times may result in higher residual carbon content. The carbon content after the annealing should be less than 0.01%. Good results have been obtained when the wet hydrogen atmosphere is maintained for a time period of about 2 hours at temperatures of from 700° to 800° C. Thereafter, and without any intermediate cooling, the annealing heat treatment is continued; however, the atmosphere is changed to dry hydrogen which has the effect of deoxidizing the microlaminations and thereby improving the overall magnetic characteristics as will be set forth hereinafter. While it has been usual to heat treat plain carbon steels in so-called "forming" gas, such type of atmosphere must be eliminated and for that matter any other oxidizing atmosphere that produces an oxide on the steel cannot be used since the oxide thickness adversely affects the packing factor of the finished core material. Annealing temperatures in excess of about 800° C should be avoided since the microlaminations may tend to weld together. While success has been attained where the microlaminations are annealed in flat trays in a box-type furnace, it will of course be recognized that for mass production, a rotary furnace can be employed or a duplex zone furnace can be employed so long as the materials are decarburized and deoxidized and any stresses resulting from cold rolling as well as in the formation of the microlamination are substantially reduced during the annealing heat treatment operation.

Figure 2:
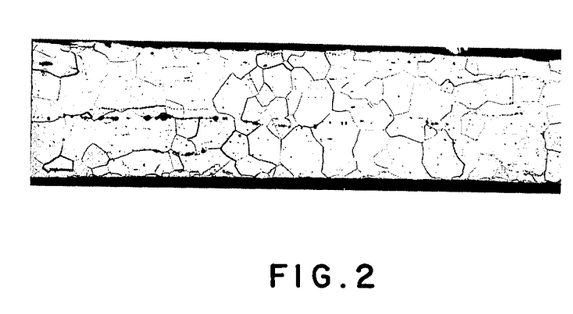
FIG. 2 is a photomicrograph of a microlamination taken at a magnification of 200X after annealing.

Referring now to FIG. 2, there is illustrated the microstructure of a microlamination after annealing for 2 hours at 745° C employing a hydrogen atmosphere having a dewpoint of about +120° F followed by an additional 2 hours at the same temperature but having a dry hydrogen atmosphere of about −40° F. In FIG. 2 it will be seen that the grains are substantially equiaxed and have grown to about ASTM size 7. This larger grain size is preferred from the magnetic characteristic viewpoint.

After the annealing operation, the microlaminations must be electrically insulated in order to develop the required core loss characteristics in the finished product. In this respect, it has been found that a very thin and flexible coating whose integrity will withstand the molding pressure and retain the interlaminar resistance is required. However, the coating must be applied after annealing since attempts to apply such a coating prior to annealing usually results in insufficient decarburization and instead of deoxidizing the surface of the steel, may actually result in an oxidation of the steel surface, thereby resulting in an adverse effect on the magnetic characteristics which are developed within the microlamination. A typical example of a suitable insulation coating is a magnesium base formulation, preferably one which is devoid of an oxygen containing radical. It has been found that a water slurry containing between about 6 to 8% magnesium methylate has fulfilled all of these characteristics. Greater concentration of magnesium methylate can be employed. A container is filled with the magnesium methylate solution and the annealed microlaminations are deposited, as by sifting, uniformly on the surface of the fluid. Characteristically, they will float momentarily due to the surface tension of the fluid and then sink to the tank bottom. In the process, the coated microlaminations with a substantially uniform adherent coating of magnesium methylate are then removed from the tank and the coating is air dried. Magnetic means may be associated with the tank, for example, a lifting magnetic means will greatly aid in removing the coated laminations from the tank. The air dried coatings have sufficient adhesion to the surface of the microlaminations that the microlaminations may be readily handled normally without destroying the integrity of the coated surface.

The magnetically insulated microlaminations are next placed into a mold in an orderly "brick wall" type arrangement and preferably are arranged in such a way that the elongated rectangles are aligned in any easy flux path in the preferred direction for ultimate use. In the case of a simple ring core, the microlaminations would be aligned with the flat faces being in a circumferential direction. This alignment may be most readily accomplished by applying to the die an electromagnet containing an iron pole piece, which is referred to as a magnetic probe.

Figure 3:
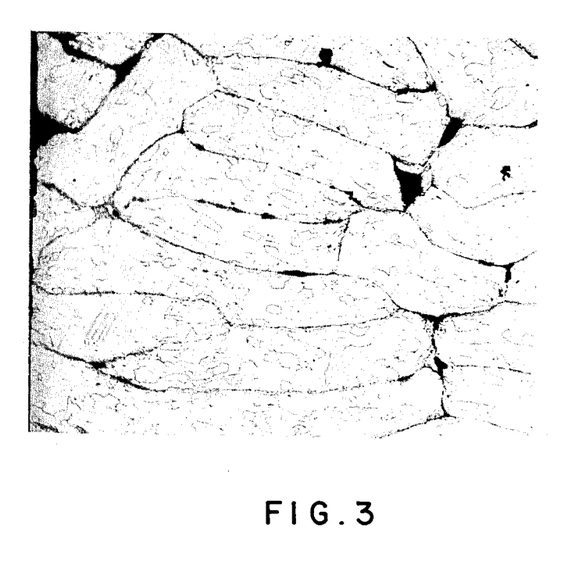
FIG. 3 is a sketch of a magnetic probe which may be employed in practicing the method of the present invention.

Referring now to FIG. 3, such a magnetic probe is depicted which essentially consists of an electromagnet which may be energized from any convenient source of electricity. More particularly, the magnetic probe is shown generally at 10 and comprises a coil electromagnet 12 which is energized from a suitable source of electricity 14 in a circuit which contains a switch 16 which may be closed as required to energize the electromagnet. The electromagnet is connected to a steel holding chuck 18 which carries an iron pole piece 20. As the chuck is rotated within the die and periodically energized by closing the switch 16 the more or less loosely disposed microlaminations are aligned in a circumferential direction. Alternatively, it has been found that by slowly pouring the laminations into the mold and mechanically distributing the same while applying a source of sonic or ultrasonic mechanical energy to the die is also surprisingly effective for aligning the microlaminates in the preferred direction with better packing density also taking place. After the mold is filled to the predetermined height, or by weight, if desired, an annular punch is inserted and a ring core is pressed in the manner known to the art.

Figure 4:
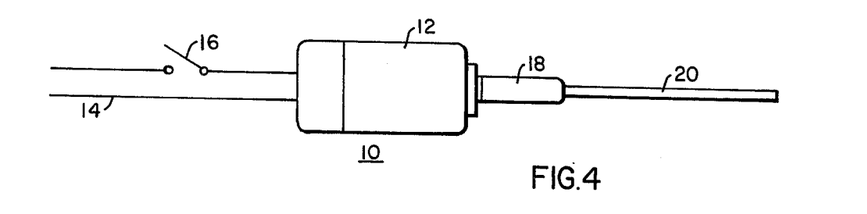
FIG. 4 is a sketch in cross-section of apparatus for forming a ring core.

Referring now to FIG. 4, a typical punch and die arrangement for such pressing of a ring core is illustrated embodying a double action uniaxial press. In FIG. 4, there is shown, in sectional elevation, a ring core mold designated generally at 30 which comprises an outer die member 32 having a centrally disposed opening 34 contained therein, an annular bottom punch 36 and an annular top punch 38 which are aligned within the central opening 34 of the die member 32. Prior to the assembly of the bottom punch 36, and the top punch 38, a core bar 40 which fits centrally of the annular top punch 38 and the annular bottom punch 36 respectively, is inserted and centered so as to form the desired dimension for the inside diameter of the ring core. The aligned microlaminations 42 which have been aligned heretofore by use of the magnetic probe as illustrated in FIG. 3, are confined within the space between the die member 32, core bar 40, the bottom punch 36 and the top punch 38. Thereafter, this assembly is subjected to uniaxial pressure by means of a double action press (not shown) or by means of a single action press, exerting a force within the range between about 50 and about 100 tons for cores of from 1 to 3 inches outside diameter. While the tonnage of the press is exemplary only, it will be understood that sufficient pressure of at least 50,000 psi be exerted on the microlaminates so as to obtain a packing factor or density which is within the range between about 80% and 100% of theoretical density. As will be more fully set forth hereinafter, the packing factor will have a substantial effect on the observed magnetic characteristics of the molded ring core, the higher the better.

It will be appreciated that while the foregoing illustrates the manufacture of a simple ring core, cores of varying complexity can be made by compacting the microlaminations in conventional powder metallurgical dies and presses. The parts so made may be of very complex shape with holes of various geometries so long as the cross-section parallel to the pressing direction contains no re-entrant angles. The process is essentially scrapless and can be automated for rather high production rates. It will of course be appreciated that hydrostatic as well as isostatic pressing can also be employed in the manner well known to form the core of the required geometry.

In order to more clearly demonstrate the present invention, reference may be had to the following. A simple ring core was formed designed to have a 1¾ inch outside diameter and a 1 inch inside diameter. AISI Type 1010 steel, having a thickness of about 0.008 inch, was employed and cut into microlaminations each averaging about 0.055 inch in length and about 0.013 inch in width. They were heated to a temperature of 745° C in an atmosphere of wet hydrogen having a dewpoint of about +120° F for a time period of 2 hours and thereafter the atmosphere was changed to dry hydrogen having a dewpoint of less than about −40° F. the annealing in dry hydrogen at a temperature of 745° C being continued for an additional 2-hour period. The microlaminations were cooled while under the influence of the hydrogen atmosphere. Thereafter, a 7% magnesium methylate formulation contained in water was employed and the microlaminates deposited on the surface of the tank containing the solution. Upon sinking to the bottom, they were removed from the tank with a magnet and air dried. The microlaminations were assembled in the shape of a ring core and aligned by employing the magnetic probe as described in FIG. 3, which magnetic probe was manually rotated within the die cavity (core bar 40 being withdrawn) at the rate of about 10 revolutions per minute with the switch mechanism periodically being opened and closed several times to energize and deenergize the magnet. A plurality of cores were made employing various molding pressures to establish a range of packing factors. These cores were then compared with commercial magnetic cores manufactured by a well-known flake iron process with the results set forth hereinafter. The flake iron cores were quite expensive as compared to the cost of the microlaminate core.

loss would be far in excess of the core loss figures set forth in Table I.

As was stated hereinbefore, the microlaminates have particular utility when their magnetic characteristics are employed in medium range frequency applications. In order to demonstrate these outstanding magnetic characteristics, reference is directed to Table II which lists a comparison of the core loss, the exciting volt amps and the permeability over a range of frequencies of from 400 Hz to 2000 Hz for microlaminated cores which were subjected to a molding pressure of a 124 kpsi (identified as "Micro") and which produced a packing factor of about 96.1% in comparison with a commercially obtained flake iron core in which the molding pressure was unknown, but which had a packing factor of 77.5%.

Table I

| Molding Force Tons | Molding Pressure psi | Packing Factor % | dc B at H=50 Oe | B at H=100 Oe | Losses AC - 60 Hz Pc/lb 15kG |
|---|---|---|---|---|---|
| 100 | 124,000 | 96.1 | 15.0 kG | 16.8 kG | 6.5 W/lb |
| 70 | 87,000 | 92.9 | 13.1 | 14.8 | 6.4 |
| 50 | 62,000 | 89.0 | 12.3 | 13.9 | 6.0 |
| Commercial Cores (Flake Iron) | | 77.5 | 6.0 | — | 5.0 at 10 kG |

In Table I there are listed the molding force and pressure, the packing factor and some DC as well as AC magnetic characteristics of cores having the indicated packing factors in comparison with commercial cores made by the flake iron process. It is interesting to note that the DC properties obtained by the present invention more than exceed double that of the commercial cores made from the flake iron process. In this respect, it is seen that as the packing factor goes up, the flux density also increases both at a field intensity of 50 oersted and at 100 oersted. As would be expected by reason of the greater deformation and the larger amount of stress that was employed in securing the more dense packing factors, the core loss increases slightly from a core loss of 6 watts per pound at 15 kilogauss and 60 hertz, up to a value of 6.5 watts per pound where the packing factor has been increased from 80% to about 96.1%. On the other hand, with a magnetizing force of 10 kilogauss the commercial core made by the flake iron process exhibited a watt loss of 5 watts per pound. However, it was impossible to energize the commercial core to 15 kilogausses and consequently it may be concluded that the 15 kilogauss core Table II

| | | Medium Frequency Magnetic Properties | | |
|---|---|---|---|---|
| Frequency | B - kG | $P_c$/lb Micro  Flake | $P_a$/lb Micro  Flake | $AC_\mu$ Micro  Flake |
| 400 Hz | .5 | 0.2 — 0.2 | 0.52 — 1.16 | 259 — 144 |
| | 1 | 0.66 — 0.8 | 1.59 — 3.92 | 357 — 175 |
| | 2 | 2.00 — 2.9 | 4.64 — 13.4 | 498 — 202 |
| | 4 | 7.0 — 9.1 | 14.0 — 56.0 | 653 — 187 |
| 1000 Hz | .5 | 0.57 — 0.68 | 1.3 — 3.0 | 256 — 142 |
| | 1 | 1.9 — 2.3 | 4.1 — 10.0 | 349 — 173 |
| | 2 | 6.6 — 7.6 | 12.2 — 34.0 | 492 — 200 |
| | 4 | 22 — 24 | 37 — 139 | 639 — 190 |
| 1500 Hz | .5 | 0.97 — 1.0 | 2.1 — 4.5 | 252 — 146 |
| | 1 | 3.2 — 3.5 | 6.6 — 15.0 | 346 — 177 |
| | 2 | 11.2 — 12.0 | 19.4 — 51.0 | 471 — 200 |
| | 4 | 38 — 38 | 60 — 209 | 616 — 191 |
| 2000 Hz | .5 | 1.3 — 1.3 | 3.0 — 6.0 | 249 — 146 |
| | 1 | 4.7 — 4.8 | 9.0 — 19 | 338 — 177 |
| | 2 | 16 — 16 | 27 — 69 | 459 — 198 |
| | 4 | 55 — 54 | 85 — 282 | 586 — 190 |

The test results set forth in Table II clearly indicate that while there is a slight improvement with varying flux densities at a frequency of 400 and 1000 hertz insofar as the core loss is concerned, above about a 1000 hertz the core loss is substantially identical between the product produced in accordance with the teachings of the present invention and with the commercially available flake iron core. However, when the aspects of the exciting volt amps, which is designated $P_a$/lb, are compared at the same flux densities and the same frequencies it becomes abundantly clear that the present process produces an outstanding improvement in the exciting VA or as it is sometimes referred to as the apparent watt loss. To substantially the same effect, the AC permeability at medium frequencies with varying flux densities clearly shows the outstanding improvement obtained by employing the teachings of the present invention. It is believed that these outstanding magnetic characteristics are in part due to the fact that employing the teachings of the present invention a higher density or greater packing factor, in addition to other benefits, is attained in the core so produced.

Figure 5:
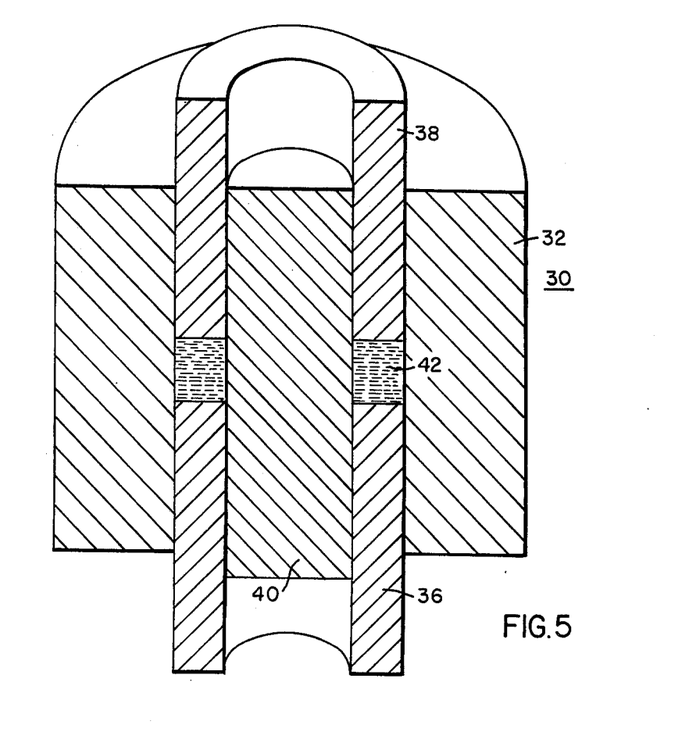
FIG. 5 is a photomicrograph taken at a magnification of 100X illustrating the cross-section of a pressed core.

Reference is directed to FIG. 5 which is a photomicrograph of the cross-section of the microlaminates after the same have been pressed into a ring core configuration in accordance with the teachings of the present invention. The essentially orderly brick wall alignment as is shown in FIG. 5 is believed to be indicative of the improved packing factor realized and provides an easy flux path in the preferred direction. This in part is due to the fact that during the annealing treatment not only is the carbon reduced to the indicated low levels which thereby improves the ductility and lowers the strength allowing for compression to attain a much higher packing factor, but in addition, the amount of strains which are actually induced to the molded ring core in accordance with the teachings of the present invention result in lower overall residual stresses thereby imparting the improved magnetic characteristics as is set forth hereinbefore.

Figure 6:
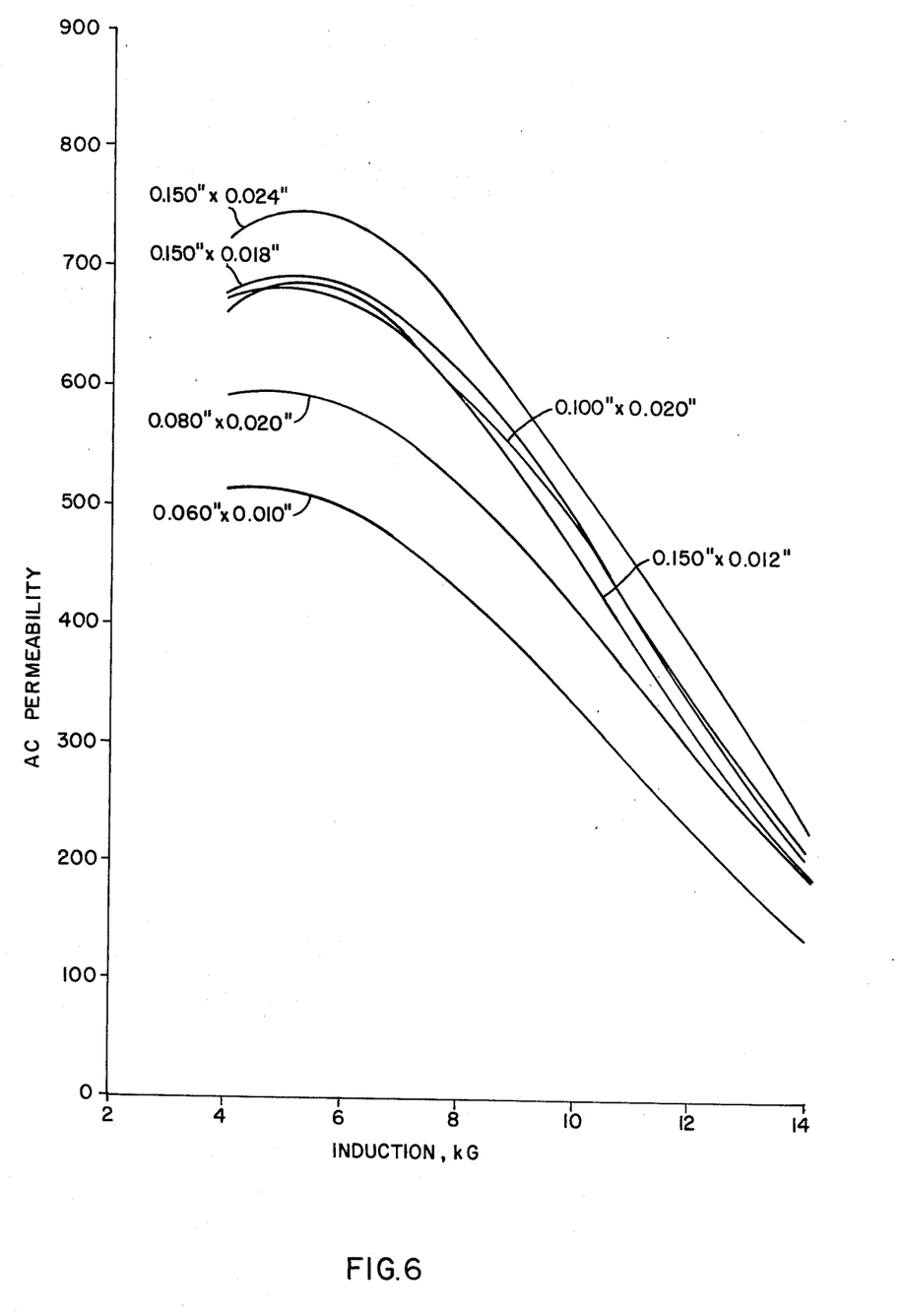
FIG. 6 is a graph illustrating the effect of microlamination geometry on the permeability.
Figure 7:
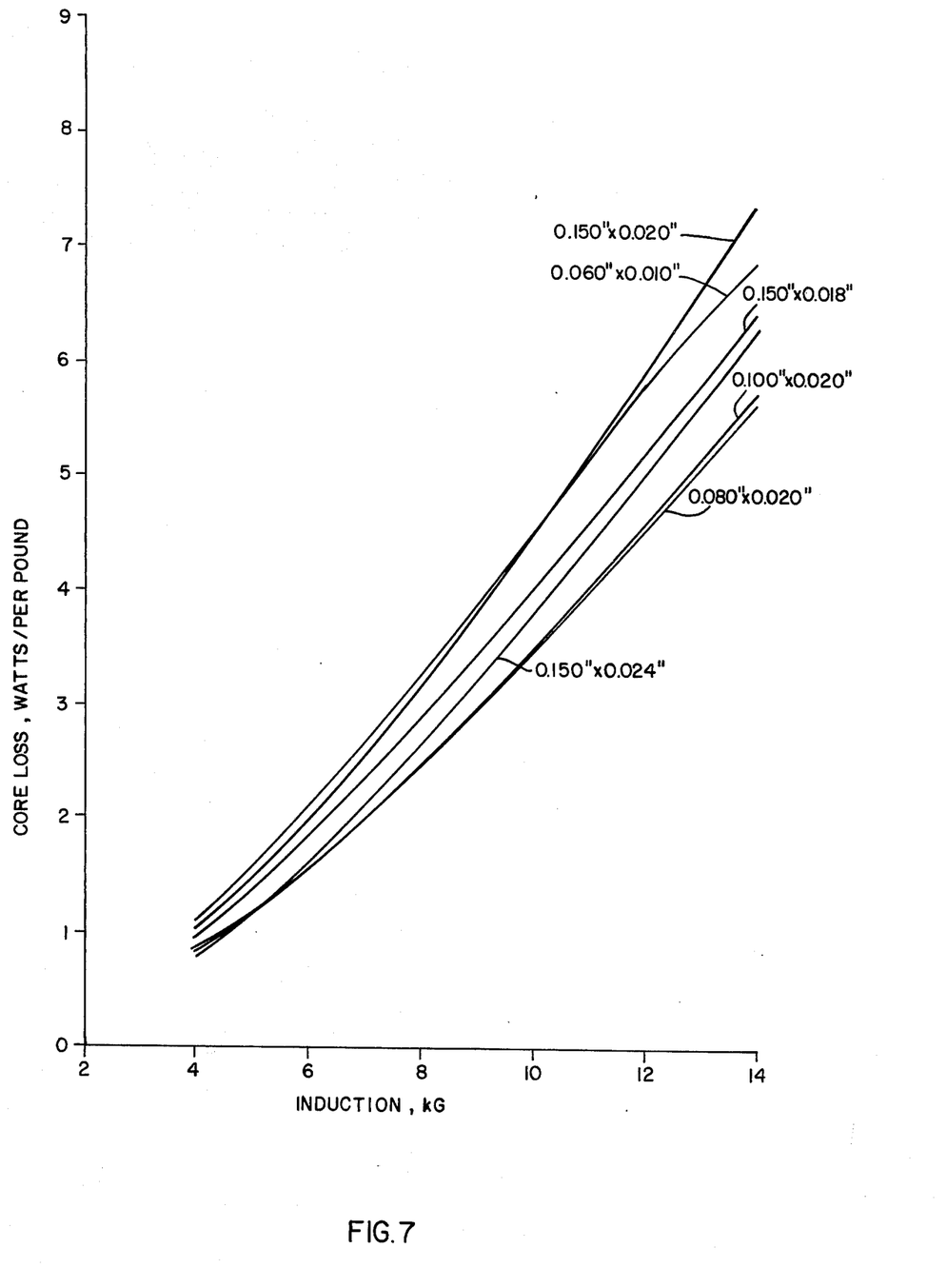
FIG. 7 is similar to FIG. 6 but demonstrates the effect of the microlamination geometry on the core loss.

Reference is now directed to FIGS. 6 and 7 which demonstrate the effect of the geometry of the microlaminations. At the outset it should be noted that an essentially cubic geometry should be avoided because it would not exhibit any polarity when subjected to a magnetic field and as a result, such a geometry would result in substantially inferior properties compared to even a spherical powder cone.

The plot of FIG. 6 is for microlaminations of various lengths and widths formed from "black plate" having a thickness of 0.006 inch and which were manufactured into the shape of a simple ring core according to the teachings of this invention. The microlaminations were subjected to a stress of 80,000 psi during the pressing operation to form the ring core. From FIG. 6 it is clear that the dimensions of the microlaminations are not critical as concerns the AC permeability but rather, the permeability is improved with increasing volume of metal, irrespective of the microlamination length and width. When the core loss characteristics are compared as in FIG. 7, it is clear that even the volume relation is random. Thus it is clear that the microlamination geometry is not critical and it is preferred to maintain the microlamination dimensions within the limits set forth hereinbefore. It will be appreciated, however, that the length, width and thickness are not limitless but rather a combination of factors enter into the selection of the microlamination dimensions not the least of which include the size of the core, the required magnetic characteristics, the mechanical requirements and the overall economics of the entire manufacturing process.

Figure 8:
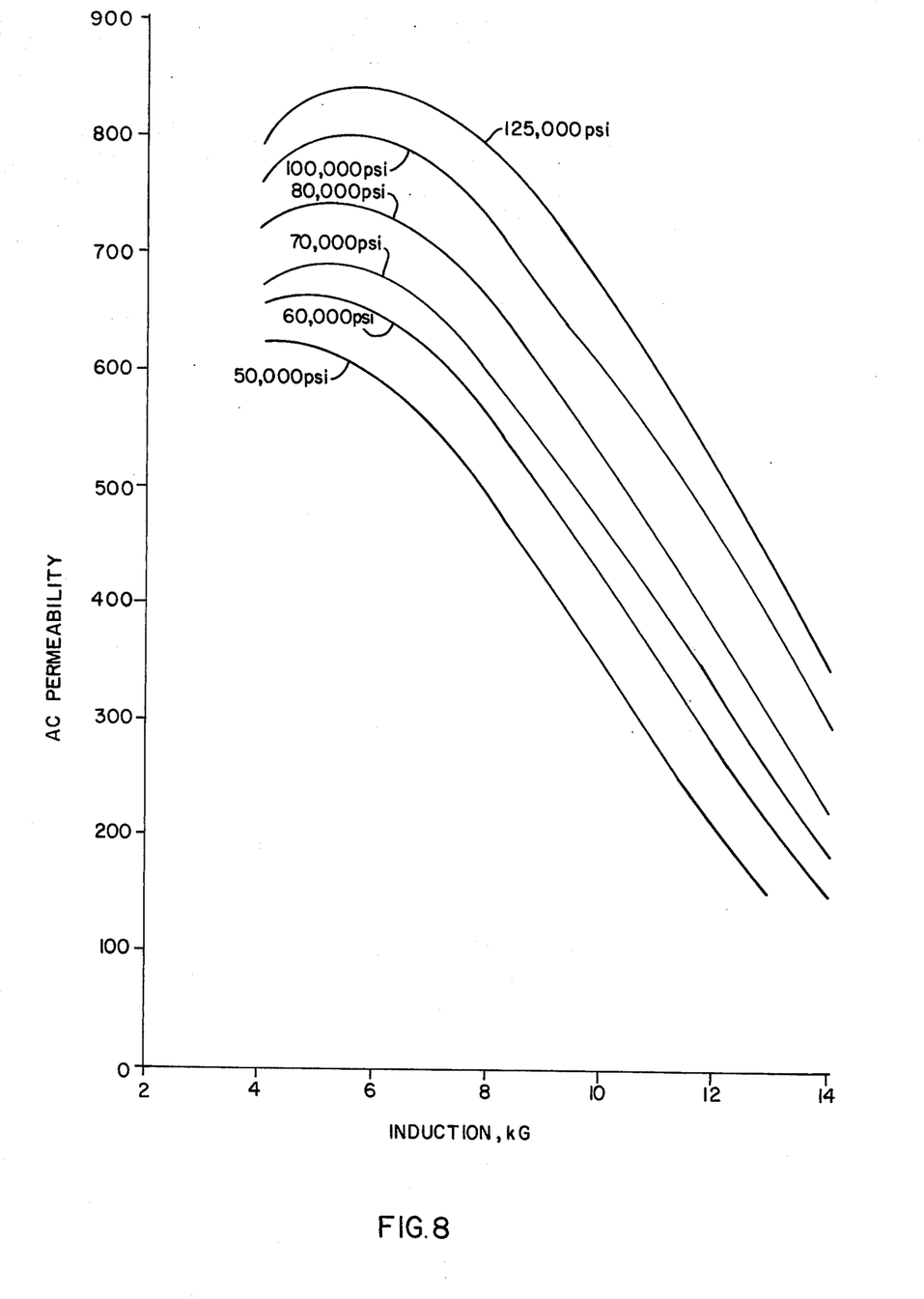
FIG. 8 is a graph showing the effect of compacting pressure on the permeability.
Figure 9:
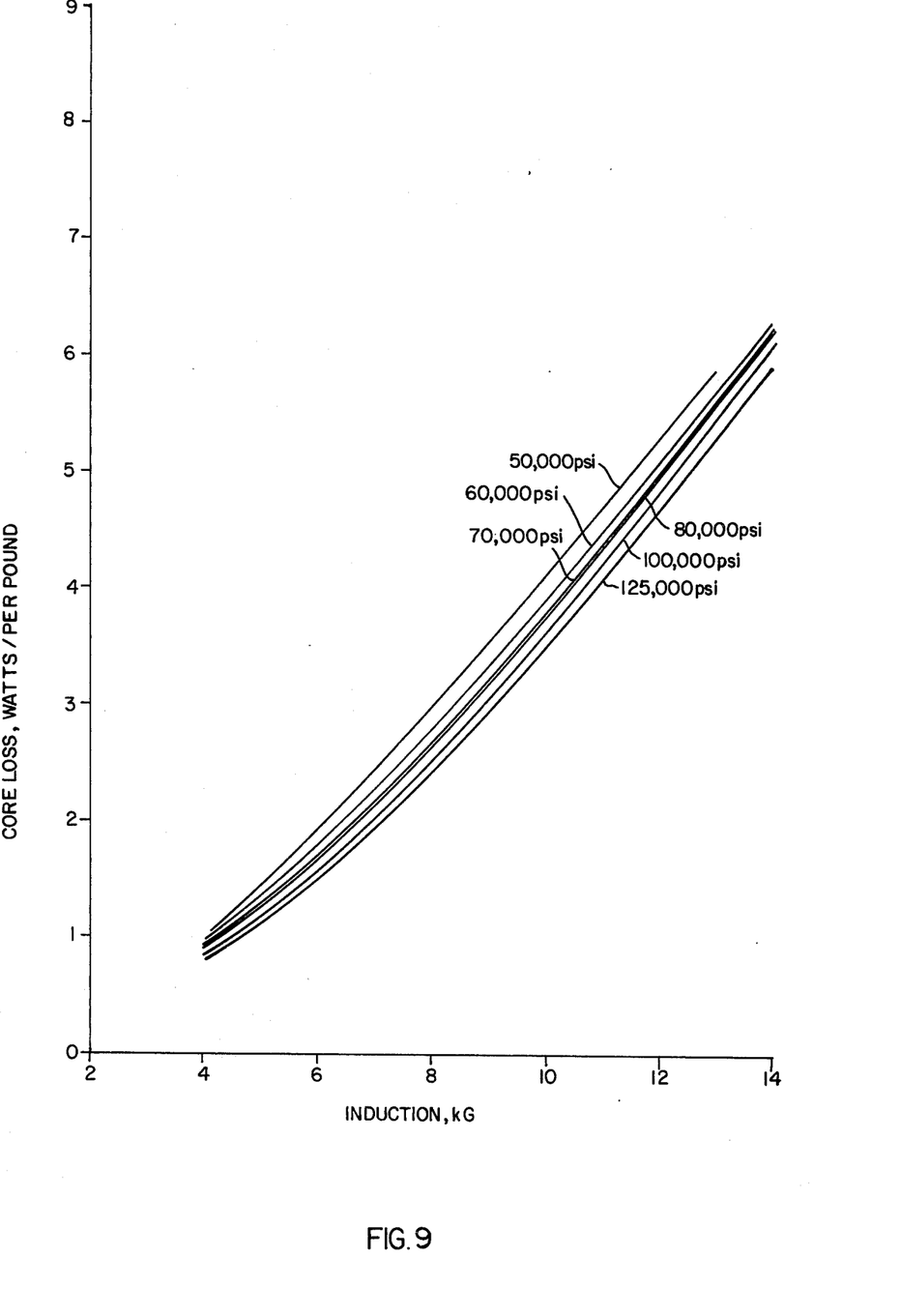
FIG. 9 is similar to FIG. 8 but illustrates the effect of pressure on the core loss.

Referring now to FIGS. 8 and 9 it is clear that increasing the pressing pressure on the microlaminations is effective for producing improved permeabilities and improved core losses. The microlaminations for the data of FIGS. 8 and 9 had average dimensions of 0.150 inch × 0.024 inch × 0.006 inch. Thus while increasing pressing pressures appear to improve the core loss and permeability there is a practical upper limit which cannot be exceeded. This limit appears to be the yield strength of the core cross section. If this limit is exceeded, extrusion may occur. Moreover, it is believed that 125,000 psi represents the practical upper limit for a uniaxial press because of the large press size and of the die materials required. Thus for a ring core having unexpectedly, outer diameter of about 1.75 inches and an inner cone diameter 1 inch the press having a rating of 200 tons was used and the 200 ton limit was attained in exerting the 125,000 psi pressing pressure.

The core loss is especially interesting since the higher pressures would appear to induce more strain and core loss is degraded by its strain sensitivity. unexpectedly, the higher pressures appear to demonstrate improved core loss values as well as permeability.

On the other hand, a minimum of 50,000 psi pressing pressure is required to obtain at least an 80% packing factor. Pressing pressures of less than about 50,000 psi has resulted in the core disintegrating under normal handling conditions. Optimum results are obtained where the pressing pressure is maintained within the range between about 80,000 psi and about 125,000 psi.

An alternative embodiment involves the aspect of a bonded core and thereby results in a change in the magnetic insulative coating employed in the present invention. Typically, the microlaminations are formed in the same manner as described hereinbefore and annealed for the purpose of decarburizing and deoxidizing the microlaminations. However, at this particular juncture, especially where the finished magnetic core product is to be used in a motor rotor, for example, or in a relay which involves mechanical stresses due either to rotation or to impact, it may be desirable to form a highly bonded core of these materials and in that respect it is preferred to change the character of the magnetic insulative film which is applied to the microlaminations.

In this respect, it has been found that a magnetically insulative bonding material which may be fired at a temperature of between about 900° C and about 1200° C can be employed. It has been found that both sodium silicate and potassium silicate work well, it being understood that other magnetically insulative coatings can be employed within the teachings of the present invention. One characteristic difference between the bonding material which also acts as a magnetically insulative film and that of, for example, magnesium methylate is the fact that the bonding magnetically insulative coating will of necessity be somewhat thicker than the magnesium methylate film which has been described heretofore. Consequently, since the bonding magnetically insulative coating is somewhat thicker, it would be expected that the packing factor would be somewhat lower and thereby result in an adverse effect on the magnetic characteristics. While this is true, some of the adverse effect on the magnetic characteristics can be compensated for by reason of the fact that the bonding magnetic insulative film is usually heated to a sufficiently high temperature following the pressing of the microlaminate core that any residual stresses which are induced during the pressing operation are relieved and as a result, the overall magnetic characteristics are not seriously adversely affected by utilizing the bonding magnetically insulative coating material as contrasted to the magnesium film which has been described hereinbefore.

More specifically, microlaminations, which have been made in accordance with the teachings set forth hereinbefore, were coated with a potassium silicate coating, the potassium silicate coating having a density between about 25 and about 45° Baume. Such a product, commercially sold under the tradename Kasil No. 1 by the Philadelphia Quartz Company, is a potassium silicate of 25° Be. This product was admixed with an equal proportion of water by volume and the microlaminations were coated in the same manner as the application of the magnesium methylate. Upon air drying, the microlaminations were assembled and aligned in the ring core configuration and pressed utilizing the same pressures as heretofore described. Following pressing of the ring core, it exhibited a packing factor between 80 and 85%. The ring core was placed in an annealing furnace and heated to a temperature of 900° C for a period of time sufficient to fuse the applied potassium silicate coating within microlaminate core to provide a strong, tough, integral core structure. Upon cooling to room temperature, and testing, the bonded core exhibited magnetic characteristics of approximately the same magnitude as those in the unbonded core whose data is set forth hereinbefore in Table I.

From the foregoing, it can be seen that the present invention teaches that small elongated rectangular steel particles cut from thin carbon steel sheets and processed to yield the required magnetic properties can be pressed to form quality cores. These cores have magnetic properties superior to commercially available cores molded from flake iron or powders. The primary benefit of this invention is improved permeability, lower core loss, lower exciting VA, lower processing cost and lower material costs than commercially available flake iron cores. The magnetic characteristics expecially at higher frequencies are far superior to those exhibited by commercially available flake iron cores.

Other binders may be advantageously employed in the manufacture of magnetic cores of this invention. Thus, the microlaminations, after insulation with a magnesium methylate may be admixed with an air setting binder such as shellac. Thereafter the microlaminations are aligned into the core configuration and pressed and held, with or without heating, until the binder has hardened or set. In this modification, the binder content should be kept to a minimum in order to obtain the highest packing factor.

Likewise, a thermal setting resin such as an epoxy resin having an anhydride hardener may be admixed with the insulated microlaminations and while the mixture is pressed, sufficient heat to attain a temperature of about 200° C is applied to cure the resin. While such binders are effective for improving the strength of the finished configuration, the cores formed without the use of a binder possesses remarkable strength and would be preferred for many applications.

We claim as our invention:

1. The method of producing magnetic core components for use in electrical apparatus, the steps comprising severing microlaminations from thin, flat strips of ferrous alloys, said microlaminations being substantially of elongated rectangular shape, annealing said microlaminations in decarburizing and deoxidizing atmospheres to improve the magnetic characteristics by reducing carbon to less than 0.01% reducing the oxygen to low values and relieving stresses, applying a thin elastic electrical insulation to the microlaminations, assembling a plurality of the microlaminations within a mold of predetermined configuration, aligning the microlaminates into a desired orientation, and thereafter pressing the aligned microlaminations into the solidified configuration of the desired core component.

2. The method of claim 1 in which the material from which the microlaminations are formed is an iron alloy having a carbon content between about 0.05% and about 0.15%.

3. The method of claim 1 in which the microlaminations each have dimensions within the range between about 0.05 and about 0.10 inch in length, about 0.005 to about 0.05 inch in width and from about 0.002 to about 0.02 inch in thickness.

4. The method of claim 1 in which the microlaminations are annealed at a temperature between about 700° C and about 800° C.

5. The method of claim 4 in which the microlaminations during annealing are heated to said temperature for a time period of up to about 6 hours.

6. The method of claim 4 in which the microlaminations are decarburized during the initial portion of the annealing cycle.

7. The method of claim 4 in which the annealing atmosphere during decarburization consists of hydrogen having a dewpoint in excess of +120° F.

8. The method of claim 7 in which the decarburization treatment is followed by a treatment in hydrogen having a dewpoint of less than −40° F.

9. The method of claim 7 in which the decarburization annealing takes place for a period between about 0.5 and about 2 hours.

10. The method of claim 1 in which the annealed microlaminates are coated in a slurry containing at least about 6% by volume of a magnesium formulation for forming a magnetically insulative coating thereon.

11. The method of claim 1 in which the microlaminations are insulated with a coating of magnesium methylate.

12. The method of claim 1 in which the microlaminations are magnetically aligned in a die and thereafter immediately pressed into the desired configuration.

13. The method of claim 1 in which the microlaminations are magnetically aligned and thereafter hydrostatically pressed into the desired configuration.

14. The method of claim 1 in which a binder is admixed with the microlaminations prior to pressing and set during pressing.

15. The method of claim 1 in which a binder is admixed with the microlaminations and set after pressing.

16. The method of claim 1 in which a magnetic coil with a pole piece is disposed within the mold containing loose microlaminations and said magnetic coil is energized prior to compressing said microlaminations for aligning the same into a predetermined configuration.

17. In the method of making a molded magnetic core, the steps comprising, forming a plurality of substantially elongated flat, rectangular-shaped microlaminations from a plain carbon steel containing from about 0.05% to about 0.15% carbon, annealing the microlaminations to improve the magnetic characteristics thereof, magnetically insulating said microlaminations, assembling said microlaminations into a preformed configuration while aligning the same into a desired orientation and thereafter pressing said microlaminations into high space factor core having the mold configuration.

18. The method of claim 17 in which a magnetic field is employed to align the microlaminations into said configuration and with a desired orientation.

19. The method of claim 18 in which the microlaminations are subjected to sufficient pressure during pressing to provide at least an 85% packing factor in the core.

20. The method of claim 19 in which the assembled aligned microlaminations are subjected to a static pressure of at least 50,000 psi.

21. A molded magnetic core comprising, a plurality of ferrous base metal microlaminations formed of substantially flat, elongated, rectangular platelets, each of said platelets having been stress-relieved, decarburized, deoxidized and insulated from one another, the microlaminations being aligned in a predetermined orientation and pressed into the desired configuration, the pressed core exhibiting a packing factor in excess of 85%.

22. The core of claim 21 in which the microlaminations are essentially parallelopiped in shape and have dimensions within the range between about 0..05 and about 0.10 inch in length, about 0.005 and about 0.05 inch in width and from about 0.002 and about 0.02 inch in thickness.

23. The core of claim 21 in which the microlaminations are molded into the preferred configuration and include a binder.

24. The core of claim 21 in which the platelets after decarburizing have a carbon content of less than about 0.01% by weight.

25. A microlamination suitable for use in molded magnetic components comprising, a substantially flat, elongated rectangular steel particle having dimensions including from about 0.05 and about 0.10 inch in length, about 0.005 and about 0.05 inch in width and from about 0.002 and about 0.02 inch in thickness, a carbon content of less than about 0.002% by weight, are substantially stress-free and having a magnetically insulating coating covering the surface of the microlaminations.

26. The microlamination of claim 25 in which the carbon content of the steel from which the microlamination is formed is within the range between about 0.07% and about 0.13% by weight.

27. In the method of making a molded magnetic core, the steps comprising, forming a plurality of substantially elongated, flat, rectangular-shaped microlaminations from magnetic alloys, heat treating the microlaminations to improve the magnetic characteristics compared to those characteristics exhibited by the alloy in the "as-severed" condition, magnetically insulating the microlaminations, assembling the insulated microlaminations into the desired configuration of the core and thereafter subjecting the microlaminations to sufficient pressure to form a molded core exhibiting a packing factor in excess of 85%.

28. A molded magnetic core comprising a plurality of magnetic alloy microlaminations, each of said microlaminations having been heat treated to improve the magnetic characteristics thereof, and magnetically insulated from one another, the microlaminations being substantially aligned in a predetermined orientation and pressed into the desired configuration, the pressed core exhibiting a packing factor in excess of 85%.

29. A microlamination suitable for use in molded magnetic components comprising a magnetic alloy in the form of an elongated parallelopiped of rectangular cross-section, the microlamination having been heat treated to improve the magnetic characteristics compared to the as-severed magnetic characteristics of the alloy and having a magnetically insulating coating covering the surface of the microlamination.

30. The method of claim 27 in which each of the microlaminations has dimensions within the range between about 0.05 and about 0.20 inch in length, about 0.005 and about 0.05 inch in width and from about 0.002 to about 0.02 inch in thickness.

31. The method of claim 28 in which each of the microlaminations has dimensions within the range between about 0.05 and about 0.20 inch in length, about 0.005 and about 0.05 inch in width and from about 0.002 to about 0.02 inch in thickness.

32. The method of claim 29 in which each of the microlaminations has dimensions within the range between about 0.05 and about 0.20 inch in length, about 0.005 and about 0.05 inch in width and from about 0.002 to about 0.02 inch in thickness.

* * * * *